(12) United States Patent
Winterhalter

(10) Patent No.: US 7,097,360 B2
(45) Date of Patent: Aug. 29, 2006

(54) HYDRODYNAMIC BEARING FOR A SPINDLE MOTOR

(75) Inventor: Olaf Winterhalter, Epfendorf (DE)

(73) Assignee: Minebea Co. Ltd, Nagano (JP)

( * ) Notice: Subject to any disclaimer, the term of this patent is extended or adjusted under 35 U.S.C. 154(b) by 35 days.

(21) Appl. No.: 10/725,972

(22) Filed: Dec. 2, 2003

(65) Prior Publication Data
US 2004/0169430 A1    Sep. 2, 2004

Related U.S. Application Data

(60) Provisional application No. 60/433,916, filed on Dec. 17, 2002.

(30) Foreign Application Priority Data

Dec. 3, 2002   (DE)   ................................. 102 56 449
Feb. 11, 2003  (DE)   ................................. 103 05 633

(51) Int. Cl.
    *F16C 17/10*   (2006.01)
(52) U.S. Cl. .................................................... 384/110
(58) Field of Classification Search ............... 384/110, 384/107, 112, 113, 115, 119
    See application file for complete search history.

(56) References Cited

U.S. PATENT DOCUMENTS 5,427,456 A      6/1995  Hensel
6,296,390 B1 *  10/2001  Wolff et al. ................. 384/112
6,364,532 B1 *   4/2002  Yoshikawa et al. ......... 384/107

FOREIGN PATENT DOCUMENTS

DE   102 00 506    7/2003
DE   102 32 933   11/2003

\* cited by examiner

*Primary Examiner*—Lenard A. Footland
(74) *Attorney, Agent, or Firm*—Joel E. Lutzker, Esq.; Anna Vishev, Esq.; Schulte Roth & Zabel LLP

(57) ABSTRACT

A hydrodynamic bearing for use in a spindle motor, having a shaft, a bearing sleeve encompassing the shaft with a small radial space, and a skewback at one end face of the bearing sleeve which is fixedly connected to the bearing sleeve. The shaft features a thrust plate or a conical or cone-like extension at its end face which faces the skewback. The diameter of the conical extension increases in the direction of the end face of the shaft. A bearing gap formed between the shaft and the bearing sleeve is filled with a bearing fluid. Dynamic pressure generating grooves are provided on one of the outer surface of the shaft and the inner surface of the bearing sleeve to generate an excess pressure in the bearing fluid.

9 Claims, 4 Drawing Sheets

HYDRODYNAMIC BEARING FOR A SPINDLE MOTOR

CROSS-REFERENCE TO RELATED APPLICATIONS

This application claims all rights of priority to U.S. Provisional Application Ser. No. 60/433,916, filed Dec. 17, 2002 and fully incorporated herein; German Patent Application Serial No. 10256449.3, filed Dec. 3, 2002 (pending) and German Patent Application Serial No. 10305633.5, filed Feb. 11, 2003 (pending).

BACKGROUND

The invention relates to a brushless DC motor of the type used in spindle motors in disk drives and, in particular, to a hydrodynamic bearing for such spindle motors.

Disk drive systems have been used in computers and other electronic devices for many years for storage of digital information. Information is recorded on concentric memory tracks of a magnetic disk medium, the actual information being stored in the form of magnetic transitions within the medium. The disks themselves are rotatably mounted on a spindle, the information being accessed by means of transducers located on a pivoting arm which moves radially over the surface of the disk. The read/write heads or transducers must be accurately aligned with the storage tracks on the disk to ensure proper reading and writing of information. Thus the disks must be rotationally stable.

Electric spindle motors of the type used in disk drives conventionally rely on ball bearings to support a rotary member, such as a rotating hub, on a stationary member, such as a shaft. Ball bearings are known to wear parts, and, in time, increased friction will cause failure of the motor. In addition, ball bearings create debris in the form of dust or fine particles that can find their way into "clean" chambers housing the rotary magnetic disks which are driven by the motor. The mechanical friction inherent in ball bearings also generates heat, noise and vibration, all of which are undesirable in a disk drive motor.

Hydrodynamic bearings represent a considerable improvement over conventional ball bearings in spindle drive motors. In these types of bearing systems, lubricating fluid, either gas or liquid, functions as the actual bearing surface between a stationary base or housing and the rotating spindle or the rotating hub of the motor. For example, air or liquid lubricants, comprising oil or more complex ferromagnetic fluids have been utilized in hydrodynamic bearing systems.

The advantages of hydrodynamic bearings over ball bearings include improved running accuracy, greater impact strength, and less noise development.

Spindle motors for data storage medium disks in which a motor shaft fixedly attached to a rotor is supported by means of a hydrodynamic bearing system are known in the art. A hydrodynamic bearing system according to the prior art comprises, for example, a bearing sleeve having a hollow cylindrical hole, which can be sealed on one side with a counter-plate. A motor shaft surrounded by a lubricating fluid, typically oil, is provided inside the bearing sleeve. One or more grooved patterns are provided on the inner surface of the bearing sleeve or on the outer surface of the motor shaft. These grooves generate hydrodynamic bearing pressure when the shaft rotates inside the bearing sleeve.

Furthermore, hydrodynamic bearings with axial track cap bearings in low-performance spindle motors are known in which the axial bearing forces in one direction are absorbed by supporting the bearing in its fulcrum on a counter-plate, while the axial opposing force is generated magnetically by, for example, the interaction between the rotor and the stator. However, these types of hydrodynamic bearings possess minimal axial rigidity in one direction. As a result, their use in hard disk drives is problematic because such applications require axial rigidity in both axial directions. On the other hand, hydrodynamic bearings with axial track cap bearings offer the advantage of having a very low level of friction loss and, consequently, a lower power consumption.

An example of a hydrodynamic bearings according to the prior art, as it is described above, is known from U.S. Pat. No. 4,934,836.

BRIEF SUMMARY

It is an object of the present invention to provide a hydrodynamic bearing for a spindle motor, especially for use in a disk drive, which operates with little power loss and a high degree of effectiveness, thereby reducing the overall power draw of the spindle motor.

It is another object of the present invention to provide the hydrodynamic bearing having a high degree of radial rigidity during operation, as well as favorable axial rigidity during the start-up and shut-down of the spindle motor.

In general, in its first aspect, the invention is a hydrodynamic bearing comprising a shaft and a bearing sleeve that encompasses the shaft with a small radial space. At one end face of the bearing sleeve, a skewback is provided which is connected to the bearing sleeve in such a manner as to prevent rotation of the sleeve. One end of the shaft is provided with a thrust plate or a conical or cone-like extension facing the skewback. The width of the conical extension increases in the direction of the end face of the shaft. This conically enlarged shaft end features an outside contour that is inclined with respect to the axis of rotation of the shaft and is accepted by the correspondingly shaped bearing sleeve.

According to the invention, at least one dynamic pressure-generating groove pattern is formed on the outer diameter of the shaft or on the inner diameter of the bearing sleeve encompassing the shaft. The pressure-generating groove pattern can be formed in a straight segment of the shaft or in the enlarged conical segment of the shaft. The shape of this groove pattern is such that it generates an excess pressure in the lower part of the bearing fluid contained in the bearing gap between the shaft and the bearing sleeve. The excess dynamic pressure in the lower part of the bearing fluid generated in the bearing fluid increases from the open end of the bearing sleeve towards the skewback (or counter plate) so that, in the area of the skewback, the pressure of the bearing fluid is greater than atmospheric pressure. This excess pressure results from a hydraulically generated pressure and a flow-dependent hydrodynamic counter-pressure. During operation, this excess pressure causes the shaft to be pressed away from the skewback and thus generates an axial bearing force which, in the prior art, is provided by other means, such as pivot bearing or magnetic force.

In a conventional hydrodynamic axial thrust bearing, a hydrodynamic bearing pressure is generated by a groove pattern formed at an end face of the shaft or a thrust plate mounted to the shaft and typically facing the counter plate. This groove pattern generates pressure gradients in the bearing fluid during the shaft's rotation. In such conventional bearing structure, a relatively small gap is provided between the grooved end face of the shaft or the thrust plate and the counter plate. This causes high power losses. For reducing power losses, alternative solutions to hydrodynamic axial bearings have been proposed in the prior art, such as the pivot bearing or the use of magnetic force mentioned above. These alternative bearings, however, require very precise manufacturing tolerances. For example, it has been shown that, when magnetically biasing a bearing, it has to be taken into account that magnetic forces decrease by the power of two with increasing distance. Providing a pivot bearing is based on the presumption that at the end face of the shaft either no gap or only a minimum gap is provided. In both bearing types, the bearing gap must be designed with minimum tolerances.

In the bearing constructed in accordance with the presently disclosed and claimed invention, the generation of the axial force is based on a hydraulically generated pressure which is independent from the axial distance or the gap width between the end face of the shaft and the counter plate. The force generated by the excess pressure is equal to the amount of pressure multiplied by the surface area to which this pressure is applied.

In the region of the thrust plate or of the conically expanded extension of the shaft, which is gradually spaced away from the shaft's axis in a radial direction, forces generated by the excess pressure in the axial direction counterbalance each other. However, in the area of the end face of the shaft there is an excess pressure which is greater than the atmospheric pressure. Force F acts on the end face of the shaft which can be calculated as follows:

$$F = (\text{excess pressure} - \text{atmospheric pressure}) * \text{area of shaft end face}$$

The force F, which is independent from the gap width between the skewback and the end face of the shaft, pushes the shaft away from the skewback (counter plate) during operation. Thus, the bearing can have a relatively large gap in the area of the end face of the shaft so that friction losses of the bearing are minimized and tend to approach zero. Further, the bearing design according to the present invention allows to loosen the requirements regarding the design tolerances of the hydrodynamic bearing. Finally in the bearing according to the present invention, it is possible to use a shaft having a relatively large diameter without increasing the power losses of the bearing. In practical application, a compromise will be made between the size of the end face of the shaft and the difference between the excess pressure and the atmospheric pressure to generate a sufficient axial bearing force.

In the area of the end face of the shaft, an axial pressure bearing can be formed at the bottom surface of the thrust plate or of the conical extension that faces the skewback by providing a corresponding grooved pattern on either the top surface of the skewback or the bottom surface of the extension. During the start-up and shut-down of the motor, the grooved structure produces a pressure gradients in the lubricating fluid thus forming an axial pressure bearing. However, when the grooved structure of the radial bearing produces excess pressure during operation, the resulting force lifts the shaft away from the skewback, which results in the gap between the shaft and skewback being expanded to such an extent as to deactivate the axial pressure bearing.

Providing the conical extension has the additional advantage of the resulting hydrodynamic bearing featuring a radial as well as an axial bearing component. This feature further improves the overall axial rigidity of the bearing. In addition, a grooved structure can be provided on the outer periphery of the conical extension that increases bearing rigidity and pressure generation below the shaft.

According to the invention, the excess pressure can be generated by forming, for example, an approximately arc, herringbone or sinusoidal grooved pattern on the outer surface of the shaft or the inner surface of the bearing sleeve. In the preferred embodiment, the groove pattern is asymmetrical such that a branch of each sinusoid facing away from the skewback is longer than the branch facing the skewback. As a result, such a grooved structure can produce a pumping effect, thereby generating the excess pressure within the bearing fluid contained in the bearing gap of the hydrodynamic bearing. As a function of the design of the grooved pattern, the excess pressure is generated along the length of the shaft, stepwise increasing from the open end of the bearing sleeve towards the skewback.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION

Figure 1:
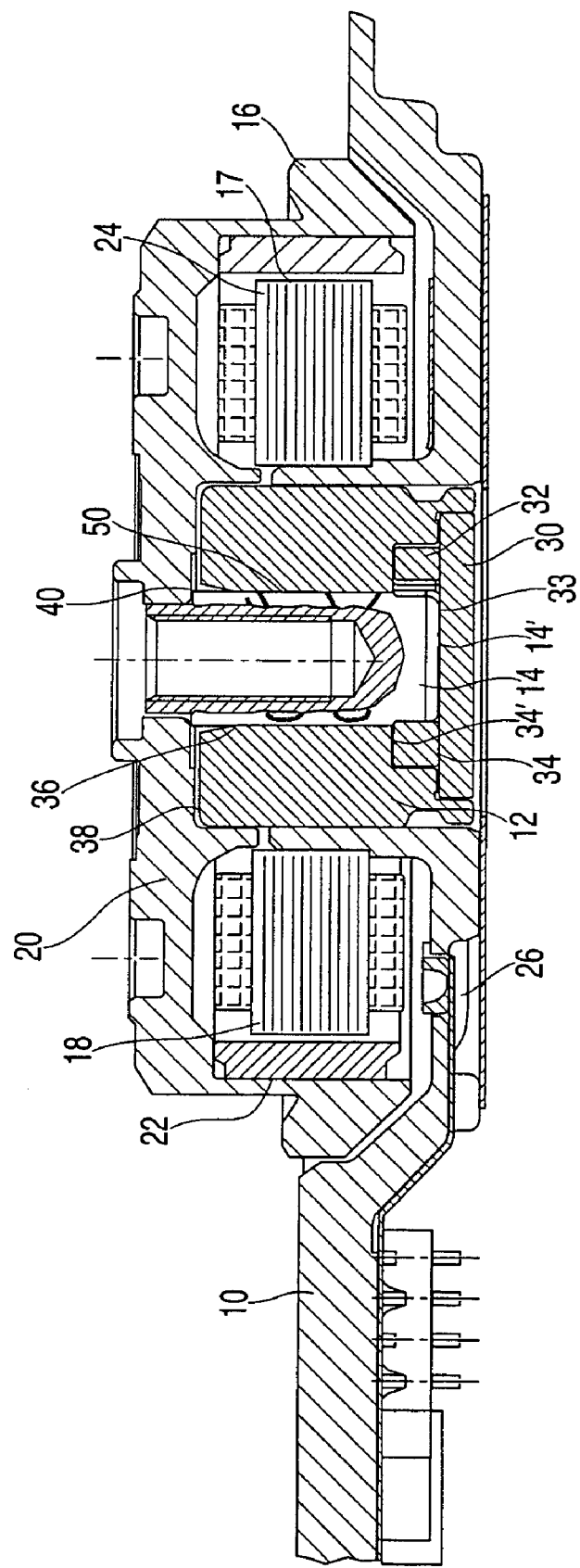
FIG. 1 is a cross-sectional view of a spindle motor.

As shown in FIG. 1, a spindle motor comprises a flange or a base plate 10 to be fastened to a disk drive (not shown). The flange 10 is fixedly secured to a bearing sleeve 12 supporting a shaft 14 for rotation. A rotor 16 is fixedly mounted on the shaft 14, in such a manner as to rotate with the shaft with respect to the flange 10 and the bearing sleeve 12. A stator 18 is fixedly connected to the flange 10.

The rotor 16 encompasses a hub 20 and the shaft 14, which is coaxially secured to the rotor hub. A rotor magnet 22 is connected to an inner peripheral wall of the rotor hub 20 by, for example, press-fitting or adhesion. The exterior of this peripheral wall of the rotor hub 20 is shaped so that it can support one or more magnetic disks (not depicted).

The stator 18 comprises a core 24 and stator coil 26 wound around the core 24. The stator 18 and rotor 16 are separated by a thin concentric gap 17, the bearing air gap.

The bearing sleeve 12 is sealed on one side by a counter-plate 30, which forms a skewback for the enclosed end 14' of the shaft 14.

A thrust plate 32 is press-fit to the end face 14' of the shaft 14. An axial pressure bearing is provided between the pressure plate 32 and the skewback formed by the counter-plate 30, wherein grooves 34 may be formed on the top surface of the counter-plate 30 for this purpose. One or more radial bearings may be formed by providing grooved patterns 36 on the outer surface of the shaft 14 or the inner surface of the bearing sleeve 12 enclosing the shaft 14. During operation, a radial pressure bearing is formed by the grooved pattern 36 between the shaft 14 and the bearing sleeve 12. Another grooved pattern 34 may be provided to form an axial pressure bearing between the counter-plate 30 and the thrust plate 32. The grooved patterns can be formed in the shape of sinusoids, spirals, herringbone patterns, or in other suitable shape patterns.

Usually a second thrust bearing having a second grooved pattern 34' is formed between the end face of the thrust plate 32 and the corresponding ring-shaped end face of the bearing sleeve 12.

As shown in FIG. 1, a conical annular gap 40 is formed between the bearing sleeve 12 and the shaft 14 on the open end face 38 of the bearing sleeve 12 facing away from the counter-plate 30. The conical gap 40 serves as a capillary seal. The basic features of such capillary seals are described, for example, in U.S. Pat. No. 5,667,309. The conical empty space forms an expansion volume and a reservoir, which is connected to the bearing gap 50, and in which the bearing fluid can be contained when the fluid level rises as the temperature increases. This prevents the bearing fluid from leaking from the bearing sleeve 12.

In the spindle motor shown in FIG. 1, a relatively high friction loss occurs in the region of the axial pressure bearing, which is formed by the grooved pattern 34. The high friction loss results from relatively large surfaces rotating within a small distance relative to one another thus forming only a small bearing or working gap 33 between them. The friction loss generated in a spindle motor as a result of such an axial pressure bearing generally comprises about 50% of the overall fluid friction of the motor. Consequently, an object of the invention, based on the design shown in FIG. 1, is to reduce the friction loss as a result of the hydrodynamic bearing in the spindle motor.

Figure 2:
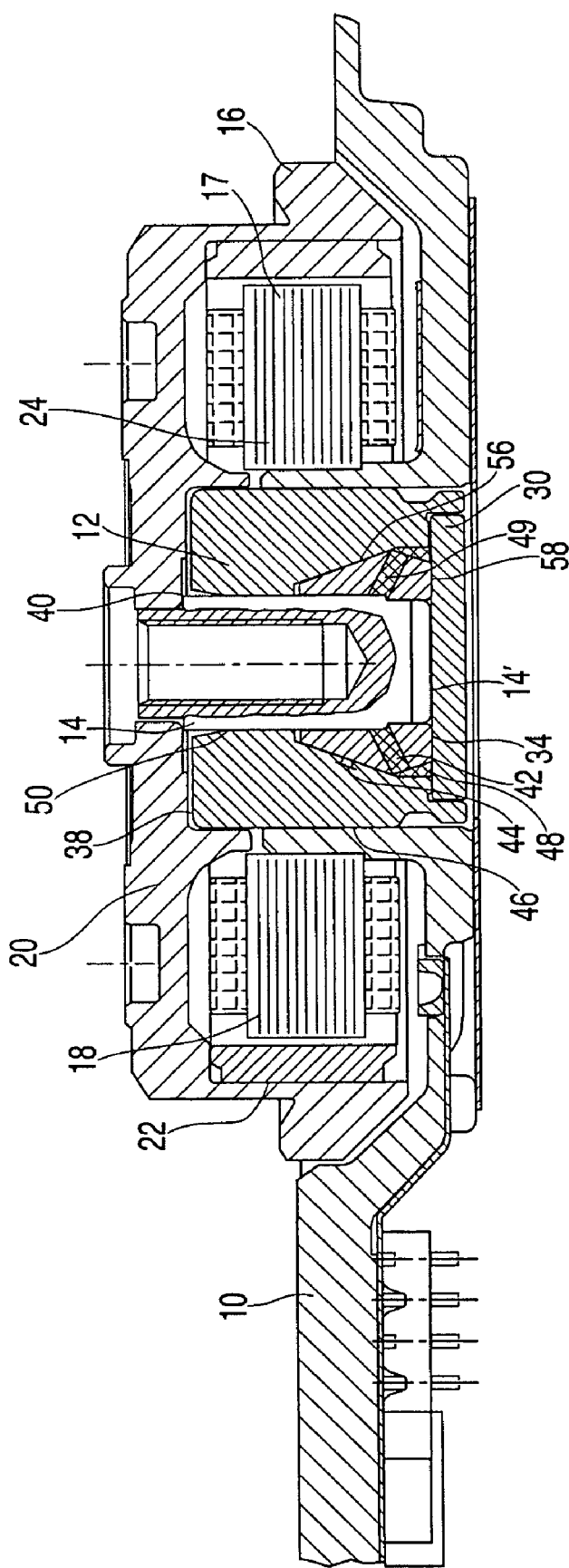
FIG. 2 is a cross-sectional view of a spindle motor illustrating a shaft having a conical extension in proximity to its end face in accordance with the present invention.

FIG. 2 shows a cross-sectional view of a spindle motor in which the present invention is applied, wherein components identical or analogous to those in FIG. 1 are given the same reference numbers and are not described again.

In the embodiment shown in FIG. 2, the lower portion of shaft 14 gradually expands as it approaches its end face 14'. For example, FIG. 2 features a conical or cone-like extension 42 in proximity to end face 14' of shaft 14, which faces the counter-plate 30. In the embodiment shown in FIG. 2, extension 42 comprises a double cone. However, the extension could also be formed to be completely conical, pear-shaped, half-spherical or spherical, or any other similar shape or combination thereof may be suitably employed. For ease, and not by way of limitation, the gradually expanding lower portion of shaft 14 is described using conical extension 42. In designing the extension 42 of the shaft 14, it is important that its shape is selected such that it can absorb both radial and axial bearing forces. Providing a conical extension has the additional advantage of a good shock resistance of the bearing due to the increased fining length between the cone and the shaft.

Additional possible forms of the extension 42 of the shaft 14 are disclosed in German Patent Application 103 39 886.0, the disclosure of which is incorporated herein by reference. However, the invention is not limited to a shaft having a conical or cone-like extension. It is also applicable to a shaft having a common thrust plate, as described with respect to FIG. 1. In the invention shown in FIG. 2, however, no hydrodynamic axial thrust bearing is formed between the thrust plate and the counter plate, as described with respect to FIG. 1. Instead, an axial hydraulic force is generated, as described below, by hydrodynamic pressure-generated grooves provided on the conical extension.

As in the embodiment shown in FIG. 1, a grooved pattern 34 which forms an axial pressure bearing can be provided at the front side of the counter-plate 30 or of the conical extension 42. This axial pressure bearing is not critical to the implementation of the spindle motor to which the present invention is applied. Although the invention could also be implemented without the grooved structure 34, this grooved structure 34 can be advantageous in terms of performance of the motor during the start-up and shut-down of the motor.

In the present invention, a grooved pattern (not shown in FIG. 2) is formed in the region of the outer periphery 46 of the straight segment of the shaft 14 or, if required, also in the region of the outer periphery 44 of the conical extension 42. This grooved pattern may instead be formed on the inner surface of the bearing sleeve 12 corresponding to outer peripheries 46 and 44. The grooved pattern generates an excess pressure in the lower part of the bearing fluid 48 provided in the gap 50 between the shaft 14 and the bearing sleeve 12.

The generation of excess pressure by the grooved pattern is achieved by providing asymmetrically formed grooves, which will be further explained below with reference to FIG. 3.

As a result of this excess pressure, axial forces are generated in the hydrodynamic bearing based on the following equation:

force=pressure×surface area.

In the region of the thrust plate or the conical extension 42, the resulting axial forces will counterbalance each other in the axial direction, since the force generated in the direction of the counter-plate 30 is exactly equal to the opposing force. In the region of the end face 14' of the shaft 14, however, the excess pressure generates a force which lifts the shaft 14 away from the counter-plate 30, creating a narrow gap 58 between the conical extension 42 and the bearing sleeve 12 and a relatively large gap 58 between the counter-plate 30 and the shaft 14. The excess dynamic pressure is countered only by the atmospheric pressure on the other side of the shaft, the atmospheric pressure being smaller than the excess pressure.

The relatively large gap 58 between the counter-plate 30 and the shaft 14 results in essentially loss-free relative motion between the shaft 14 and the counter-plate 30. The inclined contour of the conical extension 42 results in a hydrodynamic bearing being created with a relatively small axial and a relatively large radial component (depending on the slope). The radial thrust bearing, in general, generates a lower power loss than the axial thrust bearing, as a function of the diameter of the shaft and the gap width; therefore, the bearing having the conical extension 42 is more advantageous with regard to the power loss as the thrust bearing of FIG. 1.

During operation, a pressure equilibrium will ultimately occur which will maintain a constant excess pressure in order to keep the shaft 14 and its conical extension 42 at a constant distance from the counter-plate 30. By suitably selecting the shaft diameter and dimensions of the grooved pattern, a desired excess dynamic pressure can be adjusted.

As shown in FIG. 2, equalizing channels 49 which permit flow of the bearing fluid are preferably provided in the thrust plate or the conical extension 42. Fluid channels 49 preferably have a larger diameter than equalizing channels of a conventional design. Having these larger diameter equalizing channels 49 will result in an enhanced thrust pressure.

Figure 3:
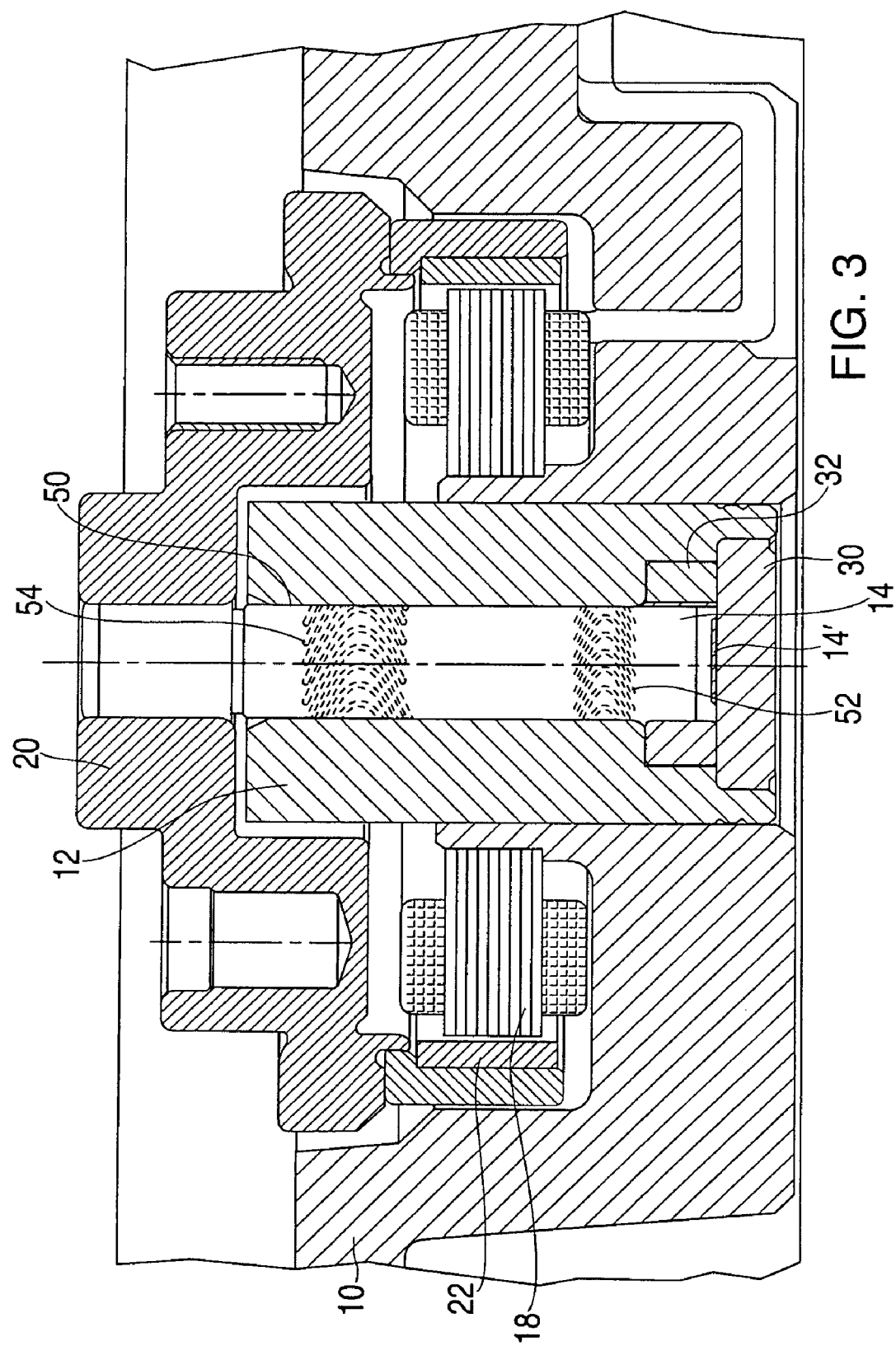
FIG. 3 is a cross-sectional view of a spindle motor illustrating pressure generating grooves formed on the outer surface of a shaft in accordance with the present invention.

FIG. 3 shows a cross-sectional partial view of a spindle motor structured similarly to that shown in FIG. 1. FIG. 3 is provided to illustrate an example of how the grooved pattern in the region of the shaft can be conceived in order to generate the desired excess pressure in the bearing fluid. Consequently, FIG. 3 is only described with reference to this grooved pattern.

FIG. 3 illustrates the bearing sleeve 12, which encompasses the shaft 14 with the small radial space, wherein the bearing gap 50 is formed between the bearing sleeve 12 and shaft 14. Also shown in FIG. 3 is the counter-plate 30, which seals the bearing sleeve 12, as well as the thrust plate 32 that serves the same purpose as that shown in FIG. 1. The shaft 14 features two grooved patterns 52 and 54, wherein each groove is formed in an approximately asymmetrical shape of a parabola or a part of a sinusoid. Branches of the parabolic or sinusoidal grooved pattern 54 facing away from the counter-plate 30 are preferably longer than the branches facing the counter-plate 30. As a result, the grooved pattern 54 produces a pumping effect, which generates excess pressure in the bearing fluid contained in the bearing gap 50. This excess pressure prevails in the entire region of the bearing gap 50, 56, and 58 below the grooved pattern 54 between the shaft 14 and the bearing sleeve 12, as well as between the thrust plate 32 and the counter-plate 30 in FIG. 3. The excess pressure generates radial and axial component forces in accordance with the following equation:

$$force = pressure \times surface\ area.$$

A person skilled in the art will understand that the radial forces acting on the shaft 14 counterbalance each other. The axial forces acting on the thrust plate 32 also counterbalance each other. However, only the atmospheric pressure generates a counter-force corresponding to the axial force acting on the shaft end 14' of the shaft 14, so that the excess pressure causes the shaft 14 to be pushed away from the counter-plate 30. This effect is utilized in the bearing according to the invention.

Figure 4:
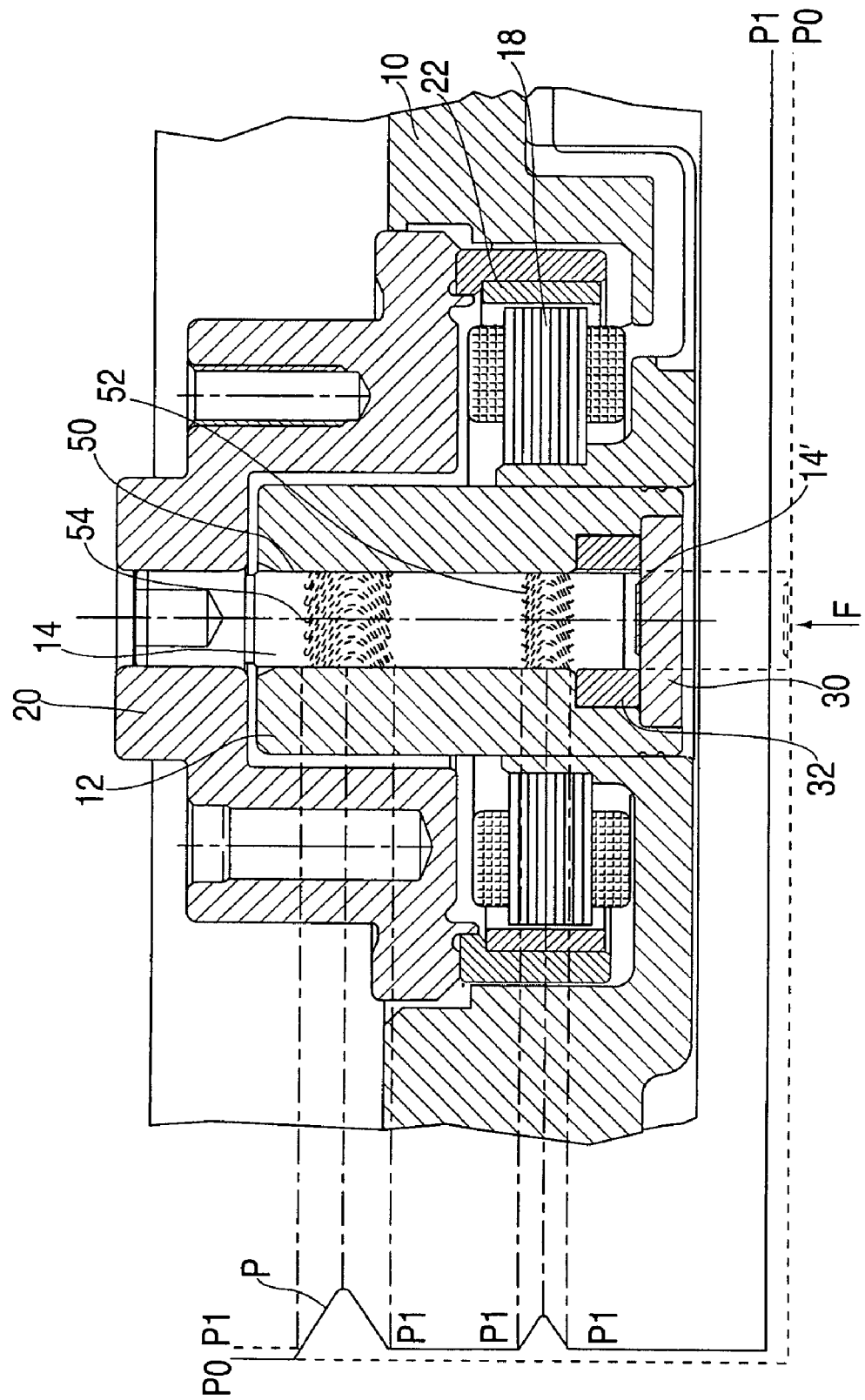
FIG. 4 is a cross-sectional view of a spindle motor illustrating the pressure profile generated during operation of the spindle motor illustrated in FIG. 3.

FIG. 4 is a cross-sectional view of the spindle motor according to the invention, schematically showing the pressure profile which is generated during operation of the motor along the length of the shaft 14. Except for the pressure profile, FIG. 4 corresponds to FIG. 3 so that the various features of the spindle motor are not described again.

As described with respect to FIG. 3, the grooved pattern 54 in the upper region of the shaft 14, which is on the drive side of the shaft, has a parabolic shape, including asymmetrical branches of different lengths. Branches extending towards the outside of the parabolic grooved pattern 54 are longer than the branches lying on the inside. Thus, a pumping effect is generated in the bearing fluid upon rotation of the shaft, resulting in the pressure profile P shown in FIG. 4, wherein the pressure of the bearing fluid at the outside of the grooved pattern 54 is P0, the pressure increases continuously towards the middle of the grooved pattern and decreases again until reaching a value P1 at the inner end of the grooved pattern 54. This pressure P1 also prevails in the area between the grooved pattern 54 and the grooved pattern 52. As the grooved pattern 52 is formed symmetrically, it generates an increase of pressure in the area of the grooved pattern itself, as shown by the pressure profile P; however, the net result on the total pressure prevailing in the bearing is zero. Accordingly, the fluid pressure in the area of the end face 14' of the shaft 14 is P1.

This results in a force F acting on the end face 14' of the shaft 14, given by:

$$F = (P1 - P0) * \text{footprint of end face 14'}$$

Accordingly, force F is an axial bearing force which is generated without any substantial losses, so that the power loss of the bearing as a whole is minimized.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

The invention claimed is:

1. A spindle motor for use in hard disk drives comprising:
a shaft, said shaft comprising a gradually expanding lower portion;
a bearing sleeve surrounding said shaft such that a bearing gap is formed between said shaft and said bearing sleeve; and
a plurality of asymmetric pressure generated grooves being formed on one of an outer surface of said shaft and an inner surface of said bearing sleeve, said asymmetric pressure generating grooves generating an excess pressure displacing a volume of lubricating fluid,
wherein said gradually expanding lower portion expands toward an end face of said shaft, and wherein said gradually expanding lower portion of said shaft is provided with at least one fluid channel, said fluid channel being configured to accommodate and pass through said volume of lubricating fluid displaced due to said excess pressure.

2. The spindle motor according to claim 1, wherein said bearing sleeve further comprises an inner surface complementing shape of said gradually expanding lower portion of said shaft, and wherein an asymmetrical groove pattern is provided on one of an outer surface of said gradually expanding lower portion of said shaft and said complementary shaped inner surface of said bearing sleeve.

3. The spindle motor according to claim 2, wherein the asymmetrical grooved pattern is sinusoid-shaped.

4. The spindle motor according to claim 2, wherein the asymmetrical grooved pattern is formed as a part of a hydrodynamic radial bearing.

5. The spindle motor according to claim 2, wherein the asymmetrical grooved pattern is formed as a part of a hydrodynamic axial bearing.

6. The spindle motor according to claim 1 further comprising a counter-plate enclosing said bearing sleeve, wherein an end face of said gradually expanding lower portion of the shaft faces the counter-plate.

7. The spindle motor according to claim 1, wherein said gradually expanding lower portion of the shaft comprises a double conical extension.

8. The spindle motor according to claim 1, wherein said gradually expanding lower portion of the shaft is a separate component attached to the shaft and being aligned to an end face of the shaft.

9. The spindle motor according to claim 6, wherein a grooved pattern is formed on the surface of said counterplate.

* * * * *